Feb. 11, 1936.  L. HANLEY ET AL  2,030,206
CAMERA
Filed Jan. 13, 1933   2 Sheets-Sheet 1
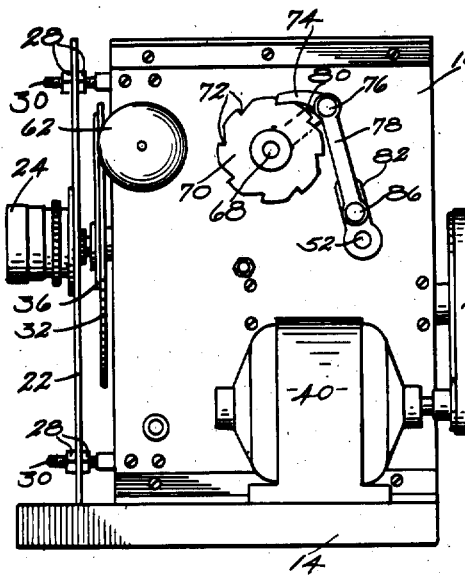
Fig. 1
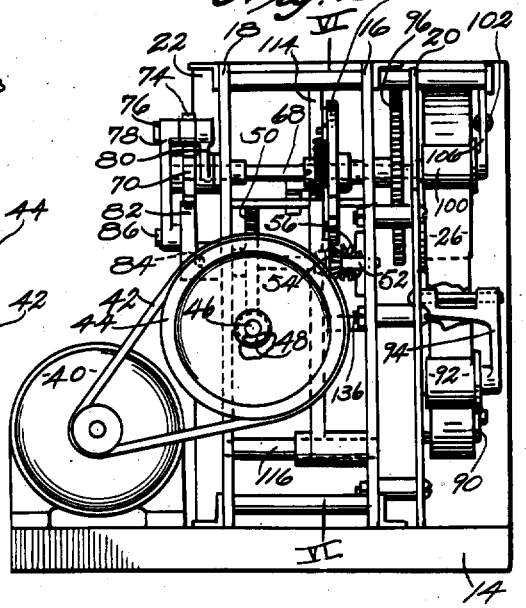
Fig. 2
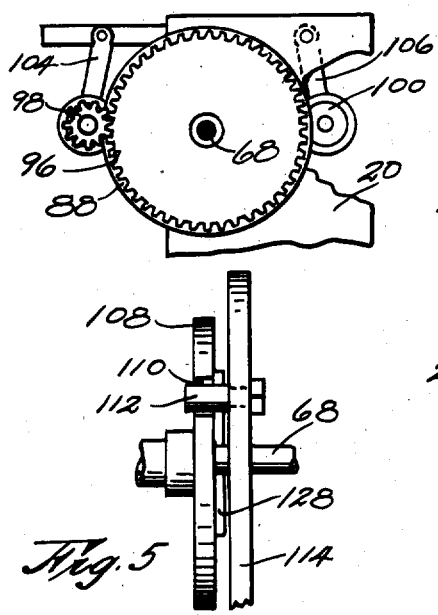
Fig. 4
Fig. 5
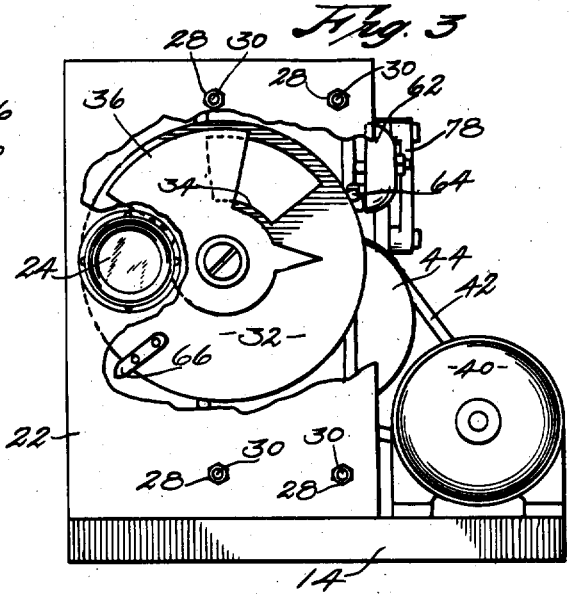
Fig. 3
INVENTORS,
Lawrence Hanley
William C. Anderson.
BY
Hovey & Hamilton
ATTORNEYS.

Feb. 11, 1936. L. HANLEY ET AL 2,030,206
CAMERA
Filed Jan. 13, 1933 2 Sheets-Sheet 2
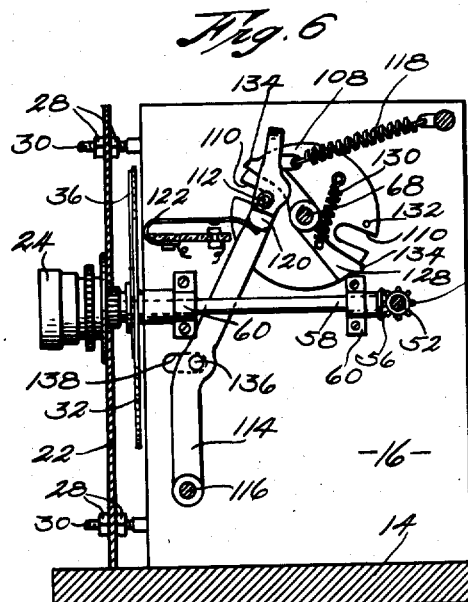
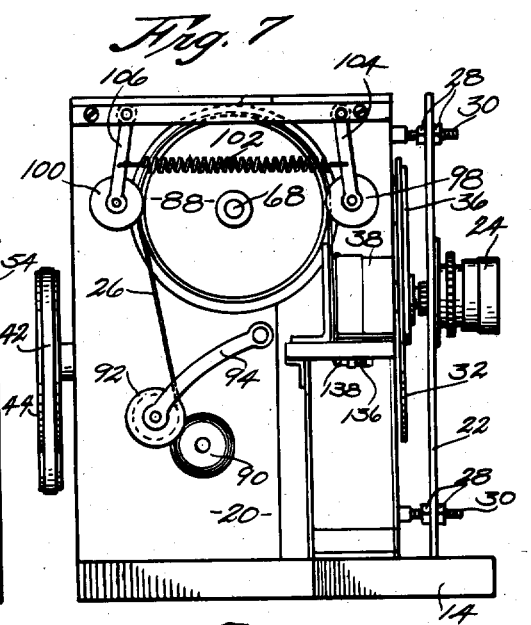
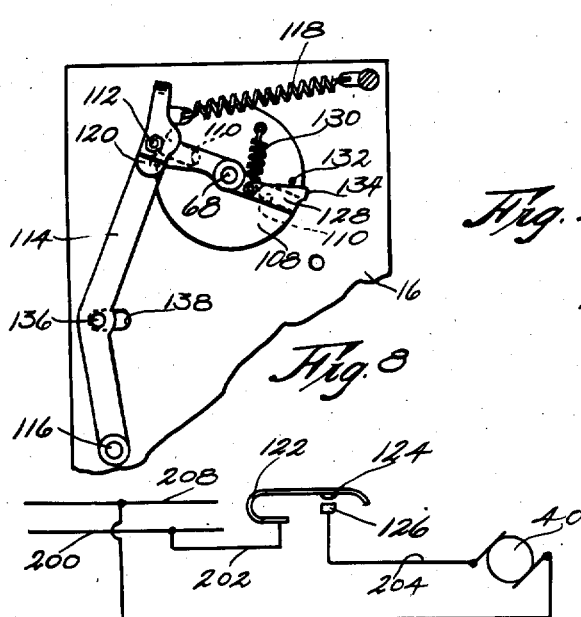
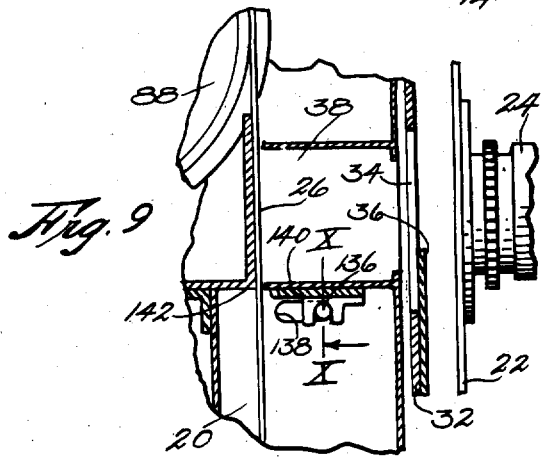
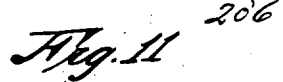
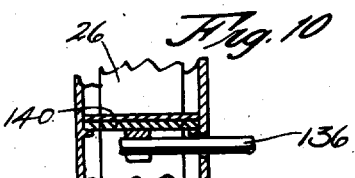
INVENTORS,
Lawrence Hanley
William C. Anderson.
BY
Hovey E. Hamilton,
ATTORNEYS.

Patented Feb. 11, 1936

2,030,206

UNITED STATES PATENT OFFICE 2,030,206

CAMERA

Lawrence Hanley and William C. Anderson, Kansas City, Mo.

Application January 13, 1933, Serial No. 651,528

9 Claims. (Cl. 88—18.2)

This invention relates to photographic apparatus, and has for a primary object, the provision of a camera, wherein is embodied a motor-driven shutter that is combined with structure for periodically advancing a sensitized strip upon which the image is photographed, said advancing means being associated with mechanism for precluding the action of said advancing means after a predetermined length of the sensitized strip has been moved and exposed.

Another object of the instant invention is the contemplation of such a camera, wherein is incorporated severing means for the sensitized strip which is simultaneously brought into action as the advancing means is halted, and also as the circuit leading to the source of power for all parts of the camera is broken by the opening of a switch that is in juxtaposition with one of the members forming a part of the aforesaid severing structure.

One of the important aims of this invention is to provide a mechanical camera of the nature above mentioned, having means for performing the function set down that is exceptionally simple, durable and strong; such means being of a nature that complicated parts are not present and likelihood of maladjustment is eliminated.

With these broad general objects in view, the invention will now be described by reference to the accompanying drawings, wherein the preferred embodiment of the invention is illustrated, and wherein:

Figure 1 is a side elevation of the mechanical parts of a camera which embody this invention, said parts being entirely removed from a housing of any nature.

Fig. 2 is a rear elevation of the same.

Fig. 3 is a front elevation of the camera, a portion of one plate being broken away for clearness.

Fig. 4 is a fragmentary, detailed view of the strip feeding drum and directly associated parts.

Fig. 5 is an enlarged, detailed view of the control disk, showing the same in edge elevation.

Fig. 6 is a vertical cross-section through the machine, taken on line VI—VI of Fig. 2.

Fig. 7 is a side elevation viewing the opposite side from that shown in Fig. 1.

Fig. 8 is a fragmentary view of the parts shown in Fig. 6, but with the same in different relative positions.

Fig. 9 is an enlarged, fragmentary, detailed, sectional view taken along a portions of the path of travel of the sensitized strip.

Fig. 10 is a detailed, fragmentary, sectional view taken on line X—X of Fig. 9, and, Fig. 11 is a diagrammatical view of the electrical circuit forming a part of the camera mechanism.

Structure of the character contemplated by this invention and embodying such features as are illustrated in the accompanying drawings may be used in automatic photographic apparatus employing coin-controlled features, or may be manually operated as is the case in the present instance. Any suitable cabinet, not here shown, may be used to house the mechanism, the same being light-tight so that when the length of sensitized strip is expelled from the structure here disclosed, the same may be developed and otherwise handled immediately prior to delivery to the subject or customer.

Base 14 carries the vertically disposed plates 16, 18 and 20, to which is adjustably affixed front plate 22, which in turn supports lens 24 and all the necessary component parts thereof that will permit presenting the proper opening. Such parts are usually called the iris diaphragm.

In practice, lens 24 is focused by moving front plate 22 toward and from the plane through which passes sensitized strip 26. When the focal point is determined, nuts 28 are moved to position along screw threaded pins 30 and further attention to the mechanism in this regard is obviated.

Proper exposure is made through the use of a motor-driven, revolving shutter 32 having an aperture 34 formed therethrough as shown in Fig. 3, which aperture may be increased and decreased in size by an adjustable shield 36 in order to obtain the desired exposure time. The axis of shutter 32 is positioned concentrically with the center of lens 24 and as shutter 32 is revolved, light is permitted to pass to sensitized strip 26 only during the time that aperture 34 is in front of lens 24. In practice, while lens 24 is closed against projecting light against strip 26 through case 38, the subject is caused to change his pose. In this manner the mechanism of the camera need not be stopped until the predetermined number of exposures are made.

A motor 40 powers the moving parts of this camera, and the same is belted as at 42 to a drive pulley 44, carried by shaft 46, which has a worm gear 48 keyed thereto that is in mesh with gear 50, mounted upon shaft 52 that extends transversely to shaft 46 and thereabove. This shaft 52 is journalled in bearings formed by plates 16 and 18 and carries a mitre gear 54 which meshes with a similar gear 56 carried at one end of shaft 58, mounted in bearings 60 that are secured to plate 16. This shaft 58 extends forwardly and it is upon the forward end thereof that shutter 32 is mounted. Rotating shaft 58 will rotate shutter 32 and power from motor 40 is transmitted to shutter 32 through the parts just set forth.

As shutter 32 is rotated, each complete revolution thereof is indicated to the operator through the use of an audible signal in the form of a bell 82, the clapper 64 of which is struck by trip 66 each time shutter 32 completes a revolution. Relative location of trip 66 and aperture 34 may be altered so that the signal is sounded immediately after exposure is made in order to give the maximum amount of time for reposing the subject.

As shutter 32 is revolved, it is necessary to periodically advance sensitized strip 26 an amount sufficient to present a new unexposed area thereof within case 38. This action is caused by the next described mechanism which is powered by motor 40. Shaft 68 is rotatably supported by plates 16 and 18 and carries, near one end thereof, a ratchet wheel 70, wherein is formed a predetermined number of teeth 72 engageable by dog 74 which is pivotally mounted upon pin 76 connecting link 78 and link 80, as shown in Figs. 1 and 2. Thus the pivotally mounted end of dog 74 may be moved around the axis of shaft 68 because of link 80. To so move dog 74 and cause the same to advance wheel 70, link 78 is pivotally secured to lever 82 which, in turn, is supported by shaft 52 and pinned thereto as shown at 84, Fig. 2. Pintle 86 joining link 78 and lever 82 travels around shaft 52 and in so doing reciprocates dog 74 so that it will periodically advance wheel 70. Thus periodic rotation is imparted to shaft 68 which transmits such movement to drum 88 that is mounted thereon at the opposite end thereof. It is over this drum 88 that strip 26 passes from the magazine roller 90, which has an idler 92 adjacent thereto for precluding objectionable unwinding. This roller 92 is carried by pivotally mounted arm 94 and tautness on the part of strip 26 is further insured by the use of gear 96 in mesh with pinion 98, the latter having engagement with drum 88.

The pitch diameter of gear 96 is the same as the diameter of drum 88 and, since gear 96, shaft 68, and drum 88 rotate together, a feeding of strip 26 is caused which will preclude buckling or other objectionable action on the part of said strip 26. Roller 100, positioned diametrically opposite pinion 98, has a connection therewith through the medium of spring 102 which may be of proper tension and changed to suit the nature of the stock used. Pivotally mounted arms 104 and 106 carry pinion 98 and roller 100 respectively. Four advancing steps are imparted to strip 26 through the aforementioned structure, and since it is desired to sever the length of strip so advanced after it has been moved forward four times, means for stopping such advancing movement is provided in the form of control disk 108. This disk is securely mounted to shaft 68 between ratchet 70 and drum 88. It is preferably carried between plates 16 and 18, as shown in Fig. 2. Disk 108 rotates with shaft 68 and has diametrically opposed notches 110 formed therein for the purpose of receiving pin 112, carried by setting arm 114 that is pivotally mounted upon shaft 116, supported by plates 16 and 18. The lower end of arm 114 is so pivotally mounted, while the upper end thereof is urged toward disk 108 by spring 118.

A shoulder 120 is formed on arm 114 which engages a switch 122 to move contact points thereof 124 and 126 toward and from each other to open and close the electrical circuit built into the camera. Obviously, when pin 112 is in engagement with either notch 110, shaft 68 cannot rotate and motor 40 must not be receiving current. When arm 114 is so positioned, switch 122 is open and motor 40 is not running. As soon, however, as arm 114 is drawn back to the position shown in Fig. 8, switch 122 will be closed and motor 40 will start for the purpose of driving all the hereinbefore mentioned parts.

A plate 128 is freely and pivotally mounted upon shaft 68 immediately against one side of disk 108. A spring 130 urges plate 128 against stop 132, whereby to cover or close both notches 110. This precludes the entrance of pin 112 into notches 110 until plate 128 is forced from over notches 110, which force must be sufficient to extend spring 130. Projections 134, integral with plate 128, lie beyond the annular periphery of disk 108 and when pin 112 strikes projection 134, movement of plate 128 is stopped as rotation of disk 108 continues to a point where pin 112 snaps into the adjacent notch 110. Obviously, this movement on the part of arm 114 will immediately open switch 122 and stop motor 40.

While disk 108 rotates to move one notch 110 around to a position where pin 112 will snap into the diametrically opposite notch, ratchet wheel 70 is being advanced four steps by dog 74 and the associated parts. Therefore, when four exposures have been made, the mechanism will stop.

Arm 114 carries bar 136 that extends through opening 138 in plate 16 to support knife 140 which is slidably mounted as shown in Fig. 10 to and from a position where the path of travel of strip 26 is intersected. A shearing action against edge 142 takes place and the length of strip 26 just previously fed through case 38 will be severed from the remaining portion thereof. This severing action takes place as arm 114 snaps into the position shown in Fig. 6. Thus a severing action and a circuit-breaking action simultaneously occurs.

The changing of control disk 108 so that the distance between notches 110 by way of the annular periphery of said disk is altered will vary the number of exposures made during a half revolution of shaft 68. Similar alterations in sizes, relations and resulting functions might likewise be made in other parts of the camera without departing from the spirit of the invention.

Fig. 11 diagrammatically illustrates the electrical circuit and manner in which switch 122 controls the action of motor 40. Current from supply line 200 reaches switch 122 by way of wire 202 and, when contact points 124 and 126 are together, conductor 204 carries the current to motor 40 from where wire 206 completes the circuit back to main line 208.

The operation of the camera mechanism embodying the features of the invention has been made clear during the course of the specification, and while but one form of the invention has been shown and described, it is not desired to be limited thereby except as required by the appended claims.

Having thus described the invention, what is claimed as new and desired to be secured by Letters Patent is:

1. A camera of the character described comprising a motor driven shutter; a sensitized strip behind the shutter; a knife to sever said strip; apparatus for periodically advancing said strip past said knife; common means movable to mechanically lock said advancing apparatus and to simultaneously actuate the knife to sever said strip after a predetermined length of the same has moved past said knife; and a switch having connection with said means for opening the motor circuit when said means moves to actuate the knife and lock the advancing apparatus.

2. A camera of the character described comprising a motor driven shutter; a sensitized strip behind the shutter; apparatus driven by said motor for periodically advancing said strip; means for stopping said apparatus from advancing said strip after a predetermined amount of the sensitized strip has been advanced including a rotatable, notched control disk, a shaft interconnecting said disk and said advancing apparatus, and an arm movable to and from engagement with said notches; and a knife to sever said sensitized strip movable to the severing position by the said arm when it is moved into engagement with the respective notches of said disk.

3. In a camera of the character described having a motor driven shutter, a circuit having a switch to supply current to said motor, and a sensitized strip associated with said shutter, a strip severing device adjacent the said strip, means for periodically advancing said strip, and apparatus controlling the said means comprising a control disk rotatable by the motor, notches formed in the periphery of the disk, a pivotally mounted arm having a pin at the free end thereof, and a spring to draw said pin into the said notches of the control disk, said arm serving to actuate the strip severing device as the spring draws the pin into any of said notches.

4. In a camera of the character described having a motor driven shutter, a circuit having a switch to supply current to said motor, and a sensitized strip associated with said shutter, a strip severing device adjacent the said strip, means for periodically advancing said strip, and apparatus controlling the said means comprising a control disk rotatable by the motor, notches formed in the periphery of the disk, a pivotally mounted arm having a pin at the free end thereof, a plate mounted for free pivotal movement at the axis of said control disk and a spring to urge the said plate into a position to overlie said notches formed in the disk.

5. In a camera of the character described having a motor driven shutter, a circuit having a switch to supply current to said motor, and a sensitized strip associated with said shutter, a strip severing device adjacent the said strip, means for periodically advancing said strip, and apparatus controlling the said means comprising a control disk rotatable by the motor, notches formed in the periphery of the disk, a pivotally mounted arm having a pin at the free end thereof, a plate mounted for free pivotal movement at the axis of said control disk, a spring to urge the said plate into a position to overlie said notches and a pin carried by the disk to serve as a stop for said plate.

6. In a camera of the character described having a motor driven shutter, a circuit having a switch to supply current to said motor, and a sensitized strip associated with said shutter, a strip severing device adjacent the said strip, means for periodically advancing said strip, and apparatus controlling the said means comprising a control disk rotatable by the motor, notches formed in the periphery of the disk, a pivotally mounted arm having a pin at the free end thereof, a plate mounted for free pivotal movement at the axis of said control disk, a spring to urge the said plate into a position to overlie said notches and a stop for the plate mounted on the disk, said plate having a projection disposed to strike the said pin of the arm whereby as the disk travels, said plate is held stationary and the notches are opened to allow said pin to enter the same.

7. In a camera of the character described having a motor driven shutter, a circuit having a switch to supply current to said motor, and a sensitized strip associated with said shutter, a strip severing device adjacent the said strip, means for periodically advancing said strip, and apparatus controlling the said means comprising a control disk rotatable by the motor, notches formed in the periphery of the disk, a pivotally mounted arm having a pin at the free end thereof, a plate mounted for free pivotal movement at the axis of said control disk, a spring to urge the said plate into a position to overlie said notches and a stop for the plate mounted on the disk, said plate having a projection disposed to strike the said pin of the arm whereby as the disk travels, said plate is held stationary and the notches are opened to allow said pin to enter the same, said arm acting to operate the strip severing device as the pin thereof enters one of said notches.

8. In a camera of the character described having a motor driven shutter, a circuit having a switch to supply current to said motor, and a sensitized strip associated with said shutter, a strip severing device adjacent the said strip, means for periodically advancing said strip, and apparatus controlling the said means comprising a control disk rotatable by the motor, notches formed in the periphery of the disk, a pivotally mounted arm having a pin at the free end thereof, a plate mounted for free pivotal movement at the axis of said control disk, a spring to urge the said plate into a position to overlie said notches and a stop for the plate mounted on the disk, said plate having a projection disposed to strike the said pin of the arm whereby as the disk travels, said plate is held stationary and the notches are opened to allow said pin to enter the same, said arm acting to operate the strip severing device as the pin thereof enters one of said notches, said arm being joined to the said switch to open the said circuit as the pin of the arm enters a notch of the disk whereby the disk is stopped and locked against further movement.

9. In a camera of the character described having a motor driven shutter, a circuit having a switch to supply current to said motor, and a sensitized strip associated with said shutter, a strip severing device adjacent the said strip, means for periodically advancing said strip, and apparatus controlling the said means comprising a control disk rotatable by the motor, notches formed in the periphery of the disk, a pivotally mounted arm having a pin at the free end thereof, a plate mounted for free pivotal movement at the axis of said control disk, a spring to urge the said plate into a position to overlie said notches and a stop for the plate mounted on the disk, said plate having a projection disposed to strike the said pin of the arm whereby as the disk travels, said plate is held stationary and the notches are opened to allow said pin to enter the same, said arm acting to operate the strip severing device as the pin thereof enters one of said notches, said arm having connection with the strip severing device to operate the same as the pin thereof enters one of said notches, the switch of said circuit being in connection with said arm whereby when movement of the pin into the notch occurs, the circuit is opened and the motor serving to drive the said disk is stopped.

LAWRENCE HANLEY.
WILLIAM C. ANDERSON.